United States Patent
He et al.

(10) Patent No.: US 10,326,356 B2
(45) Date of Patent: Jun. 18, 2019

(54) BOOST POWER FACTOR CORRECTION CIRCUIT, DRIVING CIRCUIT FOR LIGHT-EMITTING DIODE AND LIGHTING DEVICE

(71) Applicant: OSRAM GmbH, München (DE)

(72) Inventors: Junnan He, Guangdong (CN); Shaoping Chen, Guangdong (CN)

(73) Assignee: LEDVANCE GMBH, Garching Bei Munchen (DE)

( * ) Notice: Subject to any disclaimer, the term of this patent is extended or adjusted under 35 U.S.C. 154(b) by 51 days.

(21) Appl. No.: 15/315,810

(22) PCT Filed: Apr. 30, 2015

(86) PCT No.: PCT/EP2015/059529
§ 371 (c)(1),
(2) Date: Dec. 2, 2016

(87) PCT Pub. No.: WO2015/185300
PCT Pub. Date: Dec. 10, 2015

(65) Prior Publication Data
US 2017/0093274 A1 Mar. 30, 2017

(30) Foreign Application Priority Data

Jun. 3, 2014 (CN) .......................... 2014 1 0242874

(51) Int. Cl.
*H05B 33/08* (2006.01)
*H02M 1/42* (2007.01)

(52) U.S. Cl.
CPC ...... *H02M 1/4225* (2013.01); *H05B 33/0809* (2013.01); *H05B 33/0815* (2013.01); *Y02B 70/126* (2013.01)

(58) Field of Classification Search
None
See application file for complete search history.

(56) References Cited

U.S. PATENT DOCUMENTS

2015/0312983 A1* 10/2015 Hu ........................... F21K 9/64
315/186

FOREIGN PATENT DOCUMENTS

EP 2375864 A1 10/2011
WO 2014009773 A1 1/2014

OTHER PUBLICATIONS

Apr. 30, 2014—Excerpt from "Power Factor Correction (PFC) Handbook," retrieved Oct. 15, 2015, from http://www.onsemi.com/pub/Collateral/HBD853-D.pdf, pp. 13-15.
(Continued)

*Primary Examiner* — Dedei K Hammond
(74) *Attorney, Agent, or Firm* — Hayes Soloway PC

(57) ABSTRACT

A boost power factor correction circuit, a driving circuit for light-emitting diodes and a lighting device are provided. The boost power factor correction circuit includes: a PFC controller; a PFC switch controlled by an output of the PFC controller; and an equivalent variable resistor connected between the PFC switch and the ground. A feedback current input of the PFC controller is connected to a node between the PFC switch and the equivalent variable resistor. The resistance of the equivalent variable resistor is controlled by the output voltage of the PFC circuit. In case that the PFC circuit operates under an mains AC or CCG input, the resistance keeps constantly minimum, and in case that the PFC circuit operates under an ECG input, the resistance increases as the output voltage of the PFC circuit decreases. The boost power factor correction circuit, the driving circuit for light-emitting diodes and the lighting device according to the present disclosure are able to be compatible with mains AC, CCG and ECG power supplies.

20 Claims, 4 Drawing Sheets

(56) References Cited

OTHER PUBLICATIONS

Written Opinion and International Search Report issued in App. No. PCT/EP2015/059529 dated Nov. 23, 2015, 11 pages.

* cited by examiner

BOOST POWER FACTOR CORRECTION CIRCUIT, DRIVING CIRCUIT FOR LIGHT-EMITTING DIODE AND LIGHTING DEVICE

CROSS-REFERENCE TO RELATED APPLICATIONS

This application is the U.S. national phase entry under 35 U.S.C. § 371 of International Application No. PCT/EP2015/059529, filed on Apr. 30, 2015, which claims priority to Chinese Patent Application No. 201410242874.8, filed on Jun. 3, 2014, the entireties of which are incorporated by reference herein.

FIELD OF THE INVENTION

The present disclosure relates to the field of lighting driving, and in particular to a boost power factor correction (PFC) circuit, a driving circuit for light-emitting diode (LED) and a lighting device based on LED which are compatible with mains alternating current (AC), a conventional ballast (CCG) and electronic ballast (ECG).

BACKGROUND OF THE INVENTION

With growing up and constant progressing of the solid-state lighting technique, the light-emitting diode has become a preferable solution in the nowaday illuminating engineering due to its features such as high efficiency, energy conservation, long life, and environment friendly, and has been applied in illuminating products increasingly. Significant reduction in energy consumption and achievable long and reliable operation are key factors which are drawing people's attention to the LED illuminating technique.

Direct current driving is applied in all the LED lamps, including LED tube lamps. In whatever case of direct power supply via alternating current mains or power supply via CCG or ECG, a power source adaptor, i.e., LED driving circuit is required to interpose between the alternating current mains, CCG and ECG, and the LED lamps. The driving circuit has a function of converting the power supply into direct current suitable for LED.

In designing LED driving circuits, especially in designing high power LED driving circuit, it is necessary to consider the problem of power factor correction (PFC) in order to avoid reducing the power factor and causing power factor pollution in the power grid due to the application of LED lamps. An active PFC circuit is operable by adding a switch conversion circuit between an input rectifier bridge and an output filter capacitor, which corrects the input current into a sine wave with identical phase to the input voltage and without distortion, making the power factor approach one. The active PFC converter is followed by the switching power supply of a DC-DC converter for supplying the direct current suitable for LED.

Almost all of the active PFC converters are boost-typed, for the main reason that there can be a smaller output current under condition of a certain output power, thus making it possible to reduce the capacity and volume of the output capacitor, and reduce the diameter of winding wires of boost inductance elements as well.

At present, what are commercially available are limited to LED illuminating devices, such as LEG tube lamps, which are compatible with the alternating current mains and CCG, and LED illuminating devices, such as LEG tube lamps, which can only use ECG power supply. In this situation, more and more attention are paid regarding how to be compatible with the alternating current mains, the CCG and the large kinds of ECG.

SUMMARY OF THE INVENTION

According to an aspect of the present disclosure, it is provided a boost power factor correction (PFC) circuit, comprising: a PFC controller; a PFC switch, which is controlled by the output of the PFC controller; an equivalent variable resistor connected between the PFC switch and ground, wherein a terminal for inputting a feedback current of the PFC controller is connected to a node between the PFC switch and the equivalent variable resistor; wherein, the resistance of the equivalent variable resistor is controlled by the output voltage of the PFC circuit, and wherein in case that the PFC circuit is powered by mains alternating current (AC) or via a conventional ballast (CCG), the resistance keeps as a constant minimum value, whereas in case that the PFC circuit is powered via an electronic ballast (ECG), the resistance increases as the voltage output of the PFC circuit decreases.

According to an embodiment of the present disclosure, the PFC circuit may further comprise a sampling circuit configured to generate a voltage proportional to the output voltage of the PFC circuit therefrom. The equivalent variable resistor comprises a Metal-Oxide-Semiconductor field-effect transistor (MOSFET). The output voltage generated by the sampling circuit is connected to the gate of the MOSFET. The resistance of the equivalent variable resistor varies in response to operating conditions of saturated conduction and linear conduction of the MOSFET.

According to an embodiment of the present disclosure, the equivalent variable resistor may further comprise a first resistor and a second resistor. Wherein the first resistor connects with the MOSFET in series, and then the second resistor connects with the series circuit of the first resistor and the MOSFET in parallel.

According to an embodiment of the present disclosure, the MOSFET and the sampling circuit may be configured so that when the PFC is powered by mains AC or via CCG, the MOSFET operates in condition of saturated conduction.

According to an embodiment of the present disclosure, the MOSFET and the sampling circuit may be configured so that when the PFC is powered via ECG, the MOSFET operates in condition of linear conduction.

According to an embodiment of the present disclosure, the PFC controller may be configured to compare the signal received from the terminal for inputting the feedback current with a specific threshold value set in the PFC circuit, and when the signal reaches up to the specific threshold value, turn the PFC switch off, and when the signal reaches zero, turn the PFC switch on.

According to an embodiment of the present disclosure, the specific threshold may depend on the input voltage of the PFC circuit.

According to an embodiment of the present disclosure, the specific threshold may depend on the output voltage of the PFC circuit.

According to an aspect of the present disclosure, it is provided a driving circuit for light-emitting diode (LED), comprising the boost PFC circuit described above.

According to an aspect of the present disclosure, it is provided a lighting device based on a light-emitting diode (LED), comprising the driving circuit described above.

The boost PFC circuit, the driver for LED including the boost PFC circuit and the lighting device based on LED, such as the LED tube, using the driver according to the present disclosure are able to be compatible with mains AC, CCG and ECG power supplies.

BRIEF DESCRIPTION OF THE DRAWINGS

The above and other objects, features and advantages of the present disclosure will become more apparent when read in conjunction with the accompanying drawings and the description of the embodiments of the present disclosure. In the accompanying drawings, the same or corresponding reference numerals denote the same or corresponding technical features or components. In the figures, the size and relative positions of the units are not necessarily drawn to scale.

DETAILED DESCRIPTION OF THE INVENTION

The embodiments of the present invention will be described hereinafter with reference to the accompanying drawings. It is noted that those components and processing that are irrelevant to the present disclosure or known by those skilled in the art are omitted from the figures and the description.

Figure 1:
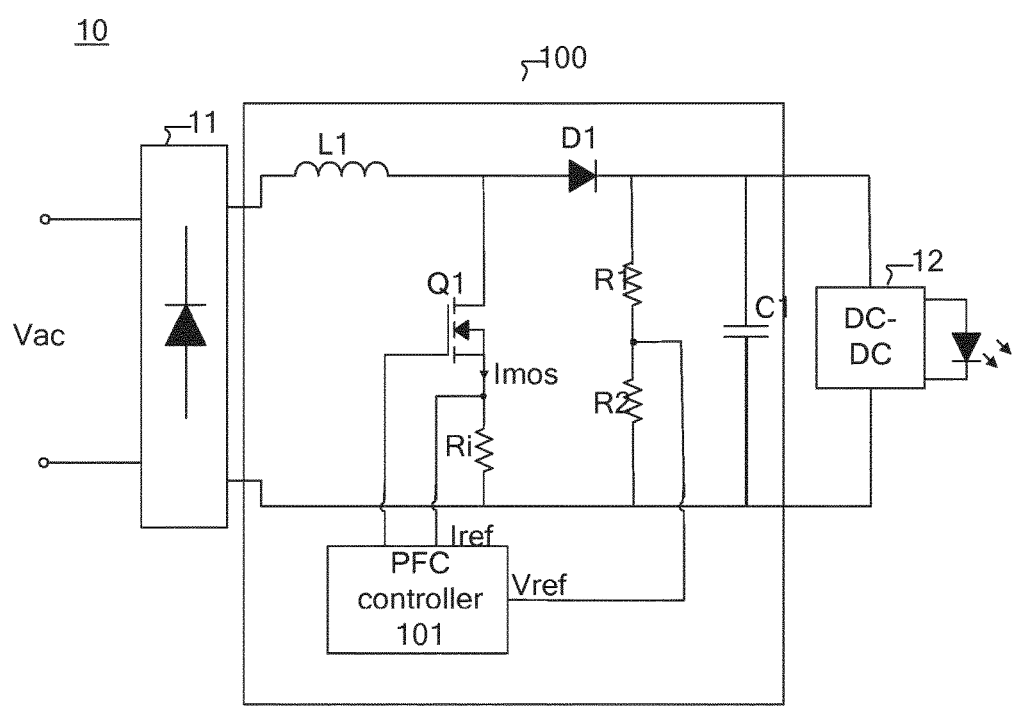
FIG. 1 is a schematic circuit diagram illustrating the circuit structure of a LED driving circuit in the prior art.

FIG. 1 is a schematic circuit diagram illustrating the circuit structure of a LED driving circuit 10 in the prior art. The LED driving circuit 10 includes a boost PFC circuit 100.

In the embodiment shown in FIG. 1, the driving circuit 10 is powered directly by mains AC, i.e., Vac. The boost PFC circuit 100 is provided with an alternating current which has been rectified by the rectifier 11 such as a bridge rectifier. The boost PFC circuit 100 corrects the phase of its input current, so that the power factor can approach 1. A DC-DC converter 12 is connected to the output of the PFC circuit 100, so as to supply the LED with suitable direct current.

The boost PFC circuit 100 includes: a boost circuit including inductance L1, a freewheeling diode (FWD) D1, switch tube Q1 and capacitor C1, voltage divider circuit for sampling the output voltage of the PFC circuit 100 which includes resistors R1 and R2, resistor R1 for sampling the current flowing through the switch tube Q1, and a PFC controller 101 for correcting the power factor by controlling the turn-on and turn-off of the switch tube Q1.

A current flows through the inductance L1 when the switch tube Q1 is turned on by the PFC controller 101. Before the inductance L1 reaches a saturation condition, current increases linearly, and the electric energy is stored in the inductance L1 in the form of magnetic energy. As this time, the capacitor C1 discharges so as to supply the load (the subsequent circuit including the DC-DC converter 12 and the LED) with power. When the switch tube Q1 is turned off by the PFC controller 101, a self-inductance electromotive force is generated across the inductance L1 to keep the direction of the current. Thereby, the self-inductance electromotive force across the inductance L1 supplies power to the capacity C1 and the load along with the source voltage rectified by the rectifier 11.

The PFC controller 101 controls the turn-on and turn-off of the switch tube Q1 according to a feedback voltage Vref and a current feedback signal Iref. The feedback voltage Vref is obtained by the sampling circuit including the resistor R1 and R2 by sampling the output voltage of the PFC circuit 100. The current feedback signal Iref is obtained by sampling, with the resistor R1, the current Imos flowing through the switch tube Q1 when the switch tube Q1 is turned on. Since the specific control logic is common to those skilled in the art, the detailed description of it is omitted here.

The existing boost PFC circuit has many advantages. For example, the input current of the existing boost PFC circuit is continuous, and can be corrected during the whole period of the sinusoidal voltage, therefore, high power factor can be obtained. Furthermore, the inductance current is just the input current of the PFC circuit, which is easier to adjust; and the continuity of the input current makes the peak of the current of the switch tube low, therefore, the PFC circuit has a high adaptability against the variance of the input voltage.

However, the existing boost PFC circuit can be merely used in case that it is supplied power directly by mains AC or via CCG. With regard to the variety of ECGs being increasingly used, the existing boost PFC circuit cannot be used because of the different characters of the current and the voltage output from the ECG comparing with those output from the mains AC and CCG. In other words, the boost PFC circuit 100 described by referring to FIG. 1 is not compatible with the condition in which the lighting device is supplied power via ECG.

This disclosure aims at to provide a boost PFC circuit, a driver for LED and a lighting device based on LED which are compatible with mains AC, CCG and ECG, and can provide high power factor.

Figure 2:
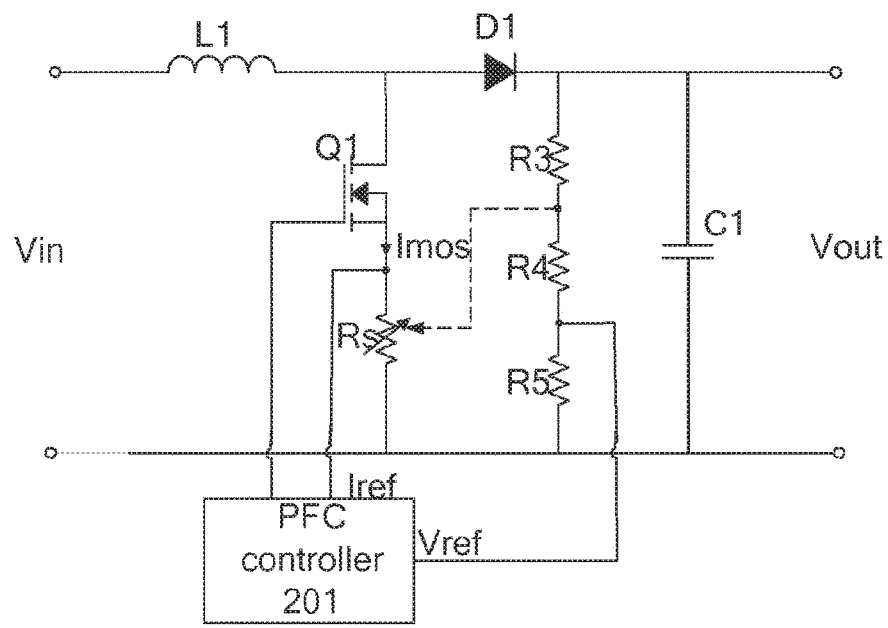
FIG. 2 is a schematic circuit diagram illustrating the circuit structure of the boost PFC circuit according to an embodiment of the present disclosure.

FIG. 2 is a schematic circuit diagram illustrating the circuit structure of the boost PFC circuit 200 according to an embodiment of the present disclosure. The boost PFC circuit 200 includes a PFC controller 201 and a switch tube Q1 (an example of the PFC switch). The switch tube Q1 is controlled by the output of the PFC controller 201. In the embodiment of FIG. 2, the switch tube Q1 is an N-channel MOS (Metal Oxide Semiconductor) tube. It can be understood by those skilled in the art that the switch tube Q1 also can be implemented with other type of semiconductor switch tube. For example, P-channel MOS tube. The output of the PFC controller 201 is connected to the gate of the switch tube Q1, so as to control the turn-on and turn-off of the switch tube Q1. The PFC controller 201 can implemented by using any kind of PFC control IC available from the marked based on the design requirement.

The output voltage Vout of the boost PFC circuit when the boost PFC circuit is powered via ECG is quite different from the output voltage Vout when the boost PFC circuit is powered by mains AC or via CCG. When the power is supplied by mains AC or via CCG, the value of the output voltage Vout of the boost PFC circuit is about 400V. While when the power is supplied via ECG, the value of the output voltage Vout is in a range of about 200V to 220V based on the types of the ECG. Therefore, according to the variances of a feedback voltage and current fed back to the PFC controller 201 due to the variance of the output voltage Vout, the PFC controller 201 can determine the type of power supply of the PFC circuit (mains AC, CCG or ECG) adaptively, and thereby control the switch tube Q1 adaptively. However, since there are many kinds of ECGs, compared with the range of 400V to 200V, when the different kinds of ECGs are used, the output voltage Vout of the PFC controller 201 varies in a finer range, such as from 200V to 300V (even from 200V to 220V). Therefore, in some embodiments according to this disclosure, additional adjustments are made to the current feedback signal, so as to reflect the finer variance of the output voltage Vout.

According to the embodiment shown in FIG. 2, the boost PFC circuit 200 includes an equivalent variable resistor Rs connected between the switch tube Q1 and the ground (not shown in the Figure). A feedback current input terminal of the PFC controller 201 is connected to the connection node between the switch tube Q1 and the equivalent variable resistor Rs. The resistance of the equivalent variable resistor Rs is controlled by the output voltage Vout of the PFC circuit 200, such that in case that the PFC circuit 200 is powered by mains AC or via a CCG, the resistance of Rs keeps as a constant minimum value, whereas in case that the PFC circuit is powered via an ECG, the resistance of Rs increases as the voltage output Vout of the PFC circuit 200 decreases.

In the embodiment shown in FIG. 2, illustratively but not restrictively, the sampling circuit for the output voltage Vout of the PFC circuit 200 includes resistors R3, R4 and R5. The voltage at the connection node between resistors R4 and R5 is provided to the PFC controller 201 as the feedback voltage Vref. The Voltage at the connection node between resistors R3 and R4 is used as the control voltage for the equivalent variable resistor Rs. This control voltage is proportional to the output voltage Vout of the PFC circuit 200 at a rate of R3/(R3+R4+R5).

Similar as the PFC circuit 100, the PFC circuit 200 further includes the inductance L1, the diode D1, the capacitor C1 and so on, the detailed description of which is omitted here.

The equivalent variable resistor Rs can be implemented by the variety of voltage-controlled variable resistors known by those skilled in the art. For example, the equivalent variable resistor Rs may include a metal oxide semiconductor field effect transistor (MOS transistor). The voltage generated by the sampling circuit for the output voltage Vout is connected to the gate of the MOS transistor to control the MOS transistor such that it can operate under conditions like a saturated conduction condition, a linear conduction condition or an off condition. Since the resistance of the MOS transistor is approximately 0 when the MOS transistor operates under the saturated conduction condition, and varies linearly when the MOS transistor operates under the linear conduction condition, the resistance of the equivalent variable resistor Rs varies in response to operating conditions of saturated conduction and linear conduction of the MOS transistor.

Figure 3:
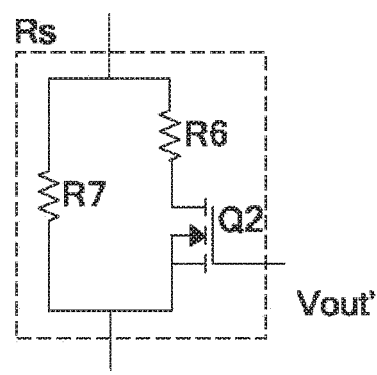
FIG. 3 is a schematic circuit diagram illustrating the circuit structure of the equivalent variable resistor according to an embodiment of the present disclosure.

Hereinafter, detailed description will be made by taking the equivalent variable resistor Rs shown in FIG. 3 as an example. FIG. 3 is a schematic circuit diagram illustrating the circuit structure of the equivalent variable resistor Rs according to an embodiment of the present disclosure. The equivalent variable resistor Rs includes resistor R7 and R6 and MOS transistor Q2. The resistor R6 connects with the MOS transistor Q2 in series, and then the resistor R7 connects with the series circuit of the resistor R6 and the MOS transistor Q2 in parallel. The connection node between resistors R6 and R7 and the connection node between resistor R7 and the MOS transistor Q2 are respectively connected with the MOS transistor Q1 and the ground. The sampled voltage Vout' obtained by sampling the output voltage Vout of the PFC circuit is applied to the gate of the MOS transistor Q2, so as to control the operating conditions of the MOS transistor Q2. In the embodiment of FIG. 3, MOS transistor Q2 is implemented by an N-channel MOS transistor. It can be understood by those skilled in the art that a P-channel MOS transistor can also be used by adjusting the circuit aptly.

According to an embodiment of this disclosure, the MOS transistor Q2 and the sampling circuit (for example, the resistances of resistors R3, R4 and R5 in FIG. 2) may be configured such that in case that the PFC circuit is powered by mains AC or via CCG, the MOS transistor Q2 operates in condition of saturated conduction. In this case, the resistance of the equivalent variable resistor Rs is constant and keeps at a minimum value, i.e., (R6+R7)/R6R7.

Additionally, the MOS transistor Q2 and the sampling circuit may be configured such that when the PFC circuit is powered via ECG (in which, generally, the output voltage of the PFC circuit is in the range of 200V to 300V), the MOS transistor Q2 operates in condition of linear conduction. Therefore, the resistance of the equivalent variable resistor Rs varies as the resistance of the MOS transistor Q2 varies linearly.

Figure 4:
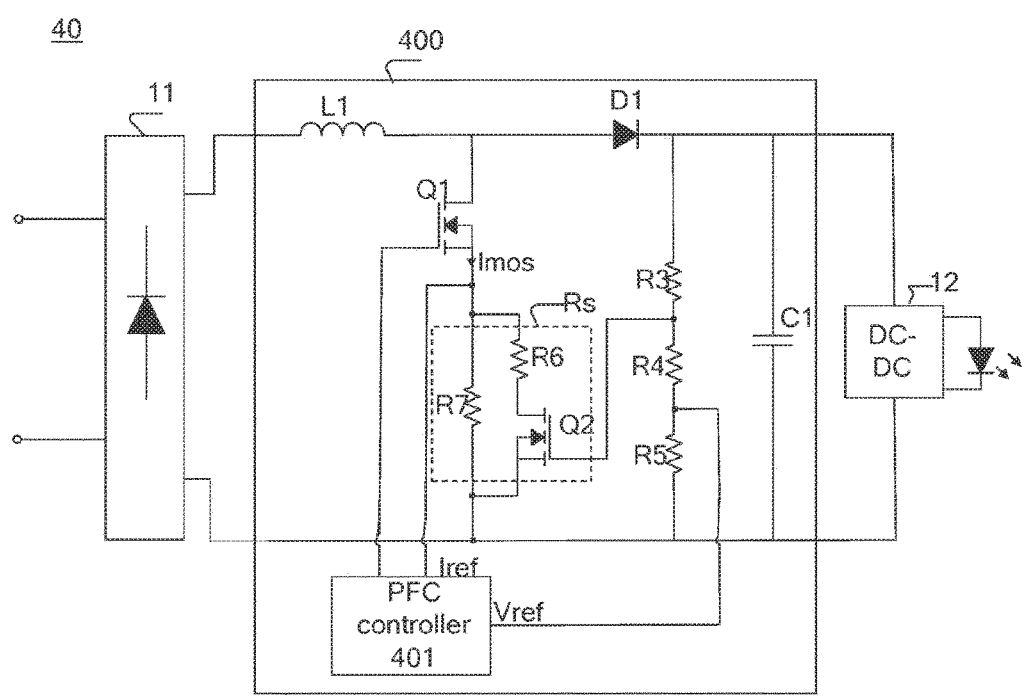
FIG. 4 is a schematic circuit diagram illustrating the circuit structure of the LED driving circuit according to an embodiment of the present disclosure.

FIG. 4 is a schematic circuit diagram illustrating the circuit structure of the LED driving circuit 40 according to an embodiment of the present disclosure. The LED driving circuit 40 includes the boost PFC circuit 400 according to an embodiment of this disclosure, rectifier 11, DC-DC converter 12 and so on.

The LED driving circuit 40 not only can be powered by mains AC, but also can be powered via CCG or any kind of ECG. The power is provided to the boost PFC circuit 400 after being rectified by the rectifier 11, such as a bridge rectifier. The boost PFC circuit 400 corrects the phase of the input current, so that the power factor approaches 1. The DC-DC converter 12 is connected to the output of the PFC circuit 400, so as to provide suitable direct current to the LED.

The boost PFC circuit 400 includes: a boost circuit including an inductance L1, a freewheeling diode D1, switch tube Q1 and capacitor C1; a PFC controller 401 for correcting the power factor by controlling the turn-on and turn-off of the switch tube Q1; a equivalent variable resistor Rs, including the resistors R6, R7 and MOS transistor Q2, for sampling the current flowing through the switch tube Q1; and a voltage divider circuit for sampling the output voltage of the PFC circuit 400 which includes resistors R3, R4 and R5. Regarding the voltage divider circuit, the sampled voltage between the resistors R3 and R4 can be used to control the turn-on and turn-off of the MOS transistor Q2, and the sampled voltage between the resistors R4 and R5 can be fed back to the PFC controller 401 as a feedback voltage Vref.

In an embodiment of this disclosure, the PFC controller 401 may compare a current feedback signal Iref (Iref=Rs*Imos) received by the feedback current input terminal of the PFC controller 401 with a specific threshold value Th set in the PFC circuit, and when the value of the signal Iref reaches up to the specific threshold vale Th, turns the switch tube Q1 off; when the value of the signal Iref reaches zero, turns the switch tube on again.

FIG. 5(a) and FIG. 5(b) are waveforms exemplifying the relation between the comparison of a current feedback signal Iref with a specific threshold Th and the gate control signal of a switch tube Q1 respectively in case that the PFC circuit operates under a mains AC (or CCG) input and in case that the PFC circuit operates under an ECG input.

The waveform in FIG. 5(a) exemplifies the relation between the comparison of the current feedback signal Iref with the specific threshold Th and the gate control signal of the switch tube Q1 (i.e., switching the switch tube Q1 on or off) in case that the PFC circuit operates under the mains AC or CCG input. In case that the PFC circuit operates under the mains AC or CCG input, the equivalent variable resistor Rs is tuned to the minimum value. In the example as shown in FIG. 4, for example, the MOS transistor Q2 is in the state of saturated conduction.

In some embodiments, the specific threshold Th may depend on the input voltage Vin of the PFC circuit. For example, Th=k*Vin, where k may be a constant, or k may depend on the output voltage of the PFC circuit. For example, the value of k may be determined by performing operations of comparison, addition, subtraction and etc. with respect to the voltage feedback signal Vref, a pre-set comparison voltage and/or the current feedback signal Iref.

In case that the PFC circuit operates under the mains AC or CCG input, the PFC controller may control the operating frequency of the switch tube Q1 based on the current feedback signal Iref and the voltage feedback signal Vref, thereby obtaining a suitable power from the AC or CCG input to achieve an optimal power factor.

Figure 5:
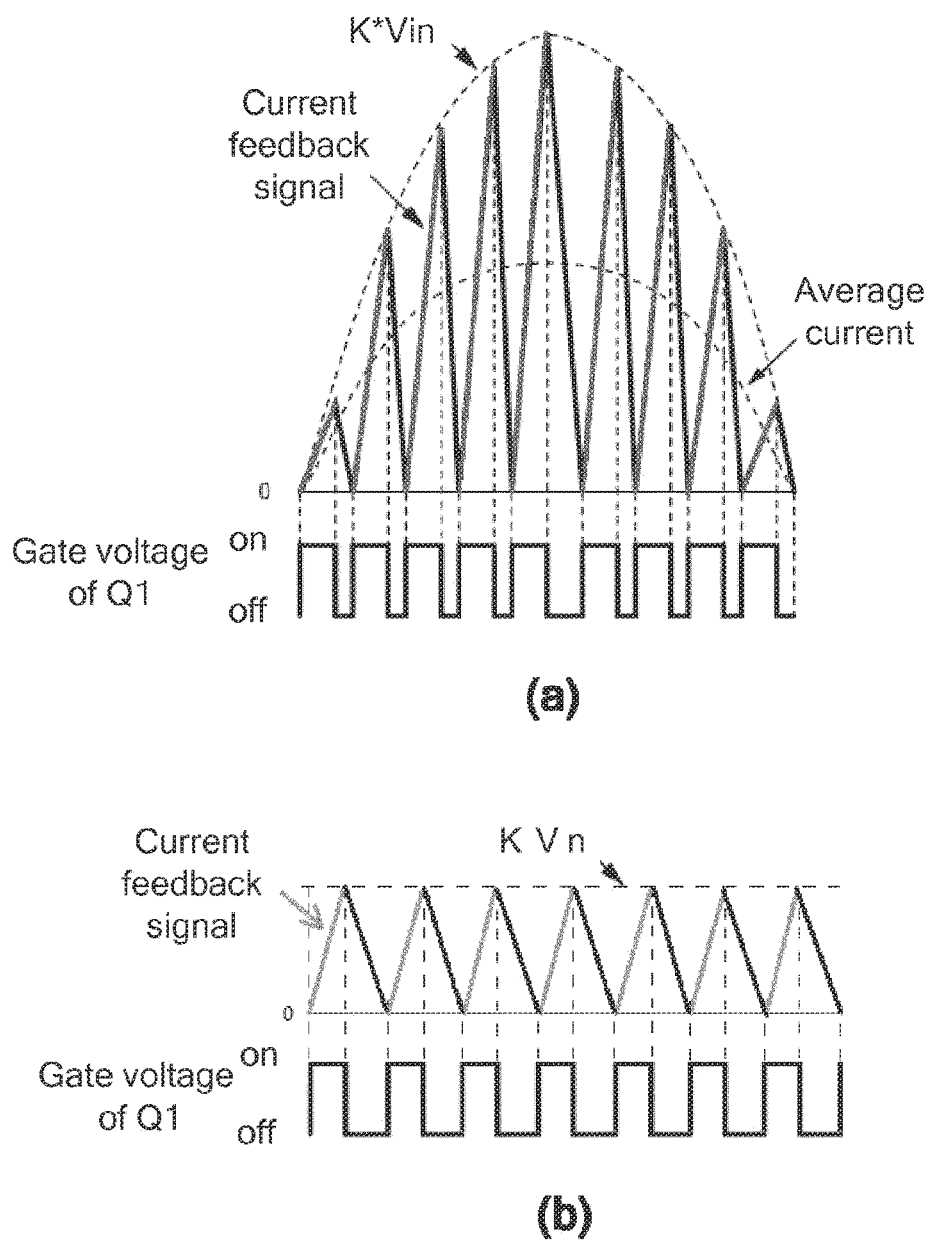
FIG. 5(a) and FIG. 5(b) are waveforms exemplifying the relation between the comparison of a current feedback signal with a specific threshold and the gate control signal of a switch tube Q1 respectively in case that the PFC circuit operates under a mains AC (or CCG) input and in case that the PFC circuit operates under an ECG input.

It can be seen from FIG. 5 (a), for example, that the switch tube Q1 operates at a variable operating frequency. When the value of the signal Iref reaches to the specific threshold Th (k*Vin), the switch tube Q1 is switched off; and when the value of the signal Iref falls to 0, the switch tube Q1 is switched on again.

The waveform in FIG. 5(b) exemplifies the relation between the comparison of the current feedback signal Iref with the specific threshold Th and the gate control signal of the switch tube Q1 (i.e., switching the switch tube Q1 on or off) in case that the PFC circuit operates under the ECG input. In case that the PFC circuit operates under the ECG input, the resistance of the equivalent variable resistor Rs changes linearly, and increases as the output voltage of the PFC circuit decreases. For example, in the example as shown in FIG. 4, the MOS transistor Q2 operates in the condition of linear conduction depending on the change in its gate voltage. In another word, the resistance of the equivalent variable resistor Rs changes depending on different ECG types (different output voltages).

It can be seen from FIG. 5 (b) that when the value (Rs*Imos) of the signal Iref reaches the specific threshold Th (k*Vin), the switch tube Q1 is switched off; and when the value of the signal Iref falls to 0, the switch tube Q1 is switched on again. Therefore, it is possible to obtain a suitable power from the ECG input to achieve an optimal power factor.

Because a filter capacitor (not shown in the figure) is usually connected in parallel at the output side of the rectifier, the filter capacitor is able to filter out sine waves of higher frequency (for example, 40 KHz) from the ECG output, and thus, in case of using the ECG power supply, the input of the boost PFC circuit 400 is a voltage of nearly constant value. As shown in FIG. 5 (b), in case that k is a constant, the threshold Th=k*Vin is also a constant value. Therefore, the switch tube Q1 may be switched on and off at a fixed frequency (for example, 50 Khz).

It should be noted that in case of the ECG power supply, although the peak current control function of the PFC controller (for example, various PFC control chip) always keeps in a trigger-enabled state, it is possible to disable the PFC function of the PFC controller for reason that the output voltage of the PFC circuit ranges only from about 200V to about 300V, instead of about 400V in case of mains AC or CCG power supply.

Compatibility with direct power supply via AC mains, CCG power supply and various ECG power supply can be achieved through the boost PFC circuit, the LED driver including the boost PFC circuit and the LED lighting device, such as a LED tube lamp, which utilizes the driver, according to an embodiment of the present disclosure.

The present invention has been described with reference to specific embodiments in the above description. However, one skilled in the art can understand that various modifications and changes can be made without departing from the scope of the present invention as defined in the claims.

The invention claimed is:

1. A boost power factor correction (PFC) circuit comprising:
    a PFC controller;
    a PFC switch, which is controlled by an output of the PFC controller; and
    an equivalent variable resistor connected between the PFC switch and ground, wherein a terminal for inputting a feedback current of the PFC controller is connected to a node between the PFC switch and the equivalent variable resistor;
    wherein a resistance of the equivalent variable resistor is controlled by an output voltage of the PFC circuit; and
    wherein in the case that the PFC circuit is powered by mains alternating current (AC) or via a conventional ballast (CCG), the resistance keeps at a constant minimum value, whereas in the case that the PFC circuit is powered via an electronic ballast (ECG), the resistance increases as the output voltage of the PFC circuit decreases.

2. The PFC circuit according to claim 1, further comprising a sampling circuit configured to generate a voltage proportional to the voltage of the PFC circuit therefrom, wherein the equivalent variable resistor comprises a Metal-Oxide-Semiconductor field-effect transistor (MOSFET), the voltage generated by the sampling circuit is connected to a gate of the MOSFET, and the resistance of the equivalent variable resistor varies in response to operating conditions of saturated conduction and linear conduction of the MOSFET.

3. The PFC circuit according to claim 2, wherein the equivalent variable resistor comprises a first resistor and a second resistor, and wherein the first resistor connects with the MOSFET in series, and then the second resistor connects with the series circuit of the first resistor and the MOSFET in parallel.

4. The PFC circuit according to claim 3, wherein the MOSFET and the sampling circuit are configured so that when the PFC circuit is powered by mains AC or via CCG, the MOSFET operates in condition of saturated conduction.

5. The PFC circuit according to claim 3, wherein the MOSFET and the sampling circuit are configured so that when the PFC circuit is powered via ECG, the MOSFET operates in condition of linear conduction.

6. The PFC circuit according to claim 2, wherein the MOSFET comprises an N-channel MOS transistor.

7. The PFC circuit according to claim 2, wherein the MOSFET comprises a P-channel MOS transistor.

8. The PFC circuit according to claim 2, wherein the sampling circuit comprises a first resistor and a second resistor.

9. The PFC circuit according to claim 8, wherein a voltage at a connection node between the first resistor and the second resistor is provided as a control voltage for the equivalent variable resistor.

10. The PFC circuit according to claim 8, wherein the sampling circuit further comprises a third resistor.

11. The PFC circuit according to claim 10, wherein a voltage at a connection node between the second resistor and the third resistor is provided to the PFC controller as a feedback voltage.

12. The PFC circuit according to claim 1, wherein the PFC controller is configured to compare a signal received from the terminal for inputting the feedback current with a specific threshold value set in the PFC circuit and:
   when the signal reaches up to the specific threshold value, turn the PFC switch off; and
   when the signal reaches zero, turn the PFC switch on.

13. The PFC circuit according to claim 12, wherein the specific threshold depends on an input voltage of the PFC circuit.

14. The PFC circuit according to claim 12, wherein the specific threshold depends on the output voltage of the PFC circuit.

15. A driving circuit for a light-emitting diode (LED), the driving circuit comprising the boost PFC circuit according to claim 1.

16. A lighting device based on a light-emitting diode (LED), the lighting device comprising the driving circuit according to claim 15.

17. The lighting device according to claim 16, further comprising a ballast configured to be electrically coupled with the PFC circuit to provide power thereto.

18. The lighting device according to claim 16, wherein the lighting device is compatible with mains AC, CCG, and ECG power supplies.

19. The PFC circuit according to claim 1, wherein the PFC switch comprises an N-channel MOS transistor.

20. The PFC circuit according to claim 1, wherein the PFC switch comprises a P-channel MOS transistor.

* * * * *